US012585943B2

(12) United States Patent
Zhang et al.

(10) Patent No.: US 12,585,943 B2
(45) Date of Patent: Mar. 24, 2026

(54) TRANSFER LEARNING FOR SENIORITY MODELING LABEL SHORTAGE

(71) Applicant: Microsoft Technology Licensing, LLC, Redmond, WA (US)

(72) Inventors: Zheng Zhang, San Carlos, CA (US); Sufeng Niu, Fremont, CA (US); Di Zhou, Newark, CA (US); Jacob Bollinger, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 690 days.

(21) Appl. No.: 17/962,364

(22) Filed: Oct. 7, 2022

(65) Prior Publication Data

US 2024/0119278 A1     Apr. 11, 2024

(51) Int. Cl.
*G06N 3/08* (2023.01)
*G06Q 10/1053* (2023.01)

(52) U.S. Cl.
CPC ........... *G06N 3/08* (2013.01); *G06Q 10/1053* (2013.01)

(58) Field of Classification Search
CPC .................................................... G06N 3/08
USPC .......................................................... 706/20
See application file for complete search history.

(56) References Cited

U.S. PATENT DOCUMENTS

| | | | |
|---|---|---|---|
| 10,262,279 B2 | 4/2019 | Barnfield | |
| 11,853,817 B2 * | 12/2023 | Kulkarni | .................. G06F 9/542 |
| 12,125,067 B1 * | 10/2024 | Fogarty | .................. G06N 20/20 |
| 12,499,378 B2 | 12/2025 | Kletti | |
| 2002/0046074 A1 | 4/2002 | Barton | |
| 2007/0273909 A1 | 11/2007 | Chen et al. | |
| 2010/0121792 A1 | 5/2010 | Yang | |
| 2014/0122355 A1 | 5/2014 | Hardtke et al. | |
| 2015/0006422 A1 | 1/2015 | Carter et al. | |
| 2016/0261544 A1 * | 9/2016 | Conover | ................. H04W 4/08 |

(Continued)

FOREIGN PATENT DOCUMENTS

| | | |
|---|---|---|
| CN | 114610903 A | 6/2022 |

OTHER PUBLICATIONS

Devlin, et al., "BERT: Pre-training of Deep Bidirectional Transformers for Language Understanding", In Repository of arXiv:1810.04805v2, May 24, 2019, 16 Pages.

(Continued)

*Primary Examiner* — Taghi T Arani
(74) *Attorney, Agent, or Firm* — KDW Firm PLLC

(57) ABSTRACT

Techniques for using transfer learning to address label data shortage in seniority modeling for an online service are disclosed herein. In some embodiments, a computer-implemented method comprises training an initialized neural network using training examples comprising profile data and labels for the profile data, where each label comprises a standardized position title, and the training of the initialized neural network forms a pre-trained neural network. Next, the computer system may train the pre-trained neural network using training examples comprising profile data and labels for the profile data, where the labels comprise a position seniority, and the training of the pre-trained neural network forms a fine-tuned neural network. The computer system may then compute the position seniority for a user based on profile data of the user using the fine-tuned neural network, and use the position seniority of the user in an application of an online service.

20 Claims, 9 Drawing Sheets

(56) References Cited

U.S. PATENT DOCUMENTS

| | | | | |
|---|---|---|---|---|
| 2017/0228696 | A1 | 8/2017 | Brdiczka | |
| 2018/0336241 | A1 | 11/2018 | Noh et al. | |
| 2019/0361860 | A1 | 11/2019 | Rogynskyy | |
| 2020/0005134 | A1* | 1/2020 | Ramanath | G06F 16/9024 |
| 2020/0143498 | A1 | 5/2020 | Alkan | |
| 2020/0175476 | A1* | 6/2020 | Gee | H04L 67/53 |
| 2020/0364250 | A1* | 11/2020 | Kube | G06F 16/3322 |
| 2020/0380470 | A1* | 12/2020 | Wakankar | G06Q 10/1053 |
| 2020/0402013 | A1 | 12/2020 | Yeung | |
| 2021/0034975 | A1* | 2/2021 | Luo | G06Q 30/0269 |
| 2022/0245659 | A1* | 8/2022 | Zhang | G06N 3/08 |
| 2023/0245258 | A1 | 8/2023 | Ma et al. | |
| 2023/0281207 | A1 | 9/2023 | Huichao | |
| 2023/0334308 | A1* | 10/2023 | Zheng | G06N 3/047 |
| 2024/0119278 | A1 | 4/2024 | Zhang | |
| 2024/0330739 | A1 | 10/2024 | Lin | |
| 2025/0013651 | A1 | 1/2025 | Huichao | |

OTHER PUBLICATIONS

Huang, et al., "CoRel: Seed-Guided Topical Taxonomy Construction by Concept Learning and Relation Transferring", In Proceedings of the 26th ACM SIGKDD International Conference on Knowledge Discovery & Data Mining, Aug. 23, 2020, 9 Pages.

Yao, et al., "KG-Bert: BERT for Knowledge Graph Completion", In Repository of arXiv:1909.03193v2, Sep. 11, 2019, 8 Pages.

Devlin, et al., "BERT: Pre-training of Deep Bidirectional Transformers for Language Understanding", In Proceedings of Conference of the North American Chapter of the Association for Computational Linguistics: Human Language Technologies, Jun. 2, 2019, pp. 4171-4186.

Li, et al., "NEMO: Next Career Move Prediction with Contextual Embedding", In Proceedings of the 26th International Conference on World Wide Web Companion, Apr. 3, 2017, pp. 505-513.

Vaswani, et al., "Attention is all you Need", In Proceedings of 31st Conference on Neural Information Processing Systems, Dec. 2017, 11 Pages.

Non-Final Office Action mailed on Jul. 8, 2024, in U.S. Appl. No. 17/590,660, 47 pages.

Non-Final office action mailed on May 21, 2025, in U.S. Appl. No. 18/892,931, 25 pages.

Final Office Action mailed on Mar. 22, 2024, in U.S. Appl. No. 17/590,660, 46 pages.

Non-Final Office Action mailed on Jan. 18, 2024, in US Application No. 17/592, 128, 27 pages.

Non-Final Office Action mailed on Nov. 29, 2023, in U.S. Appl. No. 17/590,660, 39 pages.

Notice of Allowance mailed on Jun. 6, 2024, in US Application No. 17/592, 128 10 pages.

Final Office Action mailed on Dec. 12, 2024, in U.S. Appl. No. 17/590,660, 44 Pages.

Notice of allowance mailed on Sep. 19, 2025, in US Application No. 18/892, 931, 09 pages.

Baad, Dioika, "Automatic Job Skill Taxonomy Generation For Recruitment Systems", Eindhoven University of Technology, 2019, 70 Pages.

Gagliardelli, et al., "Generalized Supervised Meta-blocking", In Repository of arXiv:2204.08801v1, Apr. 19, 2022, 16 pages.

Gugnani, et al., "Generating Unified Candidate Skill Graph for Career Path Recommendation", In Proceedings of International Conference on Data Mining Workshops, Nov. 17, 2018, pp. 328-333.

Non-Final Office Action mailed on Dec. 29, 2025, in U.S. Appl. No. 18/126,883, (MS# 960119-US01) 58 Pages.

Notice of Allowance mailed on Dec. 23, 2025, in U.S. Appl. No. 18/892,931 (MS# 960059-US02-CON), 09 Pages.

OBA, et al., "Automatic Classification for Ontology Generation by Pretrained Language Model", In Proceeding of International Conference on Industrial, Engineering and Other Applications of Applied Intelligent Systems, Jul. 19, 2021, pp. 210-221.

* cited by examiner

200

210 — RANDOMLY INITIALIZED NEURAL NETWORK

220 — PRE-TRAINING

222 — USER PROFILE DATA AS INPUT, STANDARDIZED POSITION TITLE AS LABEL

230 — PRE-TRAINED NEURAL NETWORK

240 — FINE-TUNING

242 — USER PROFILE DATA AS INPUT, POSITION SENIORITY AS LABEL

244 — UNLABELED USER PROFILE DATA FOR SEMI-SUPERVISED LEARNING

250 — FINE-TUNED NEURAL NETWORK

300

MY NETWORK          JOBS          MESSAGING          NOTIFICATIONS

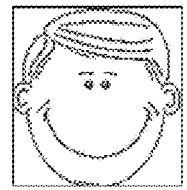

| MESSAGE | ... |

JOHN DOE
SR. MANAGER, SOFTWARE ENGINEERING AT
LINKEDIN
UNIVERSITY OF WASHINGTON
SAN FRANCISCO BAY AREA

EXPERIENCE

310-1 — SENIOR MANAGER, SOFTWARE ENGINEERING
310-2 — LINKEDIN
310-4 — SEP 2019 – PRESENT
SUNNYVALE, CA
310-3 — *MANAGING AND LEADING ENTITY RESOLUTION TEAMS IN CUSTOMER DATA PLATFORM*

TECHNICAL LEADER, MANAGER
ACME INC.
JUN 2017 – AUG 2019
PALO ALTO, CA
*PERFORMED PROJECT MANAGEMENT RESPONSIBILITIES*

SENIOR MEMBER OF TECHNICAL STAFF
ACME INC.
MAR 2014 – JUL 2017
PALO ALTO, CA
*DEVELOPED DATA MODELS AND ALGORITHMS*

MEMBER OF TECHNICAL STAFF
ACME INC.
OCT 2010 – FEB 2014
PALO ALTO, CA

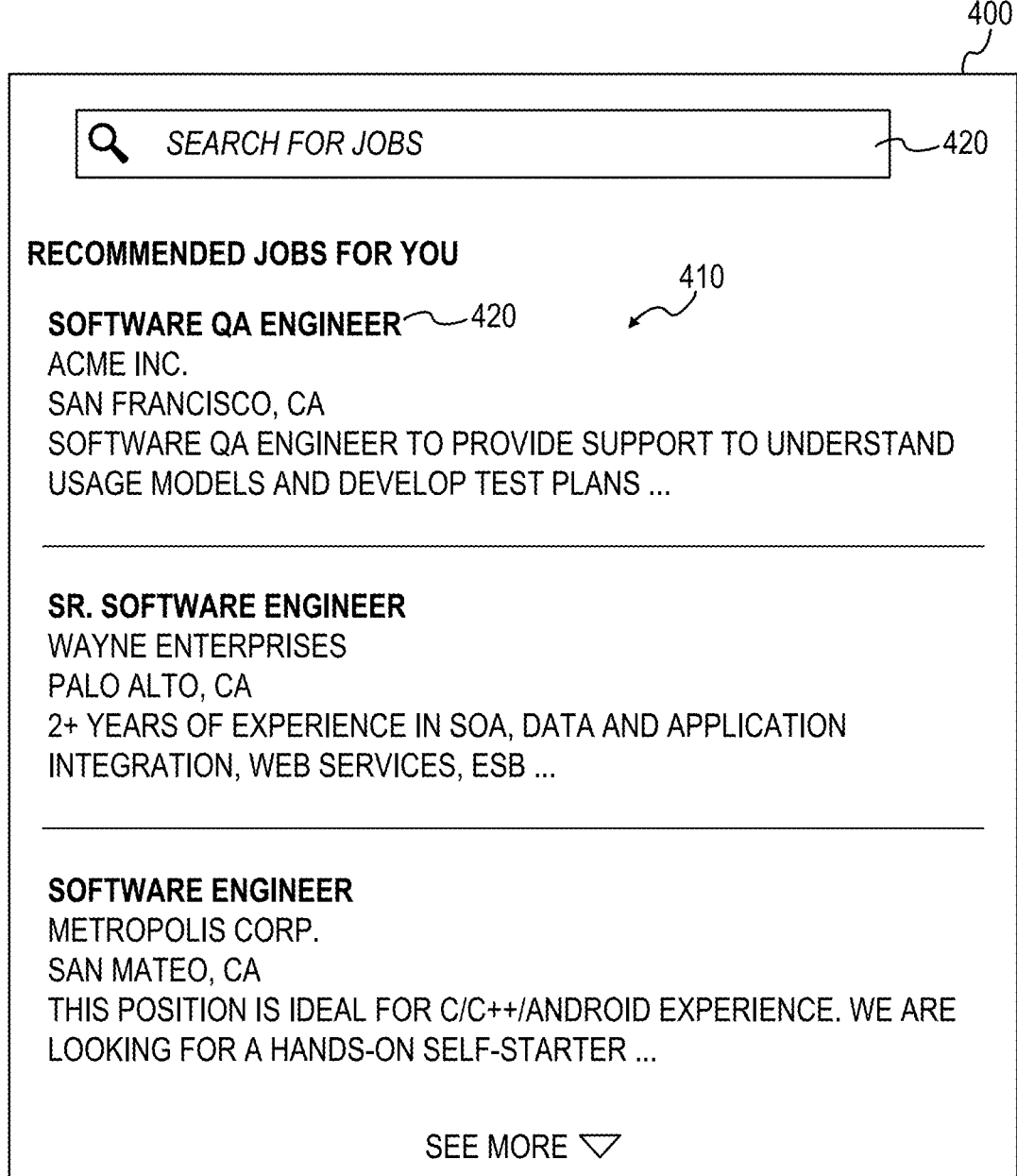

SEARCH FOR JOBS ~420

RECOMMENDED JOBS FOR YOU

410

SOFTWARE QA ENGINEER ~420
ACME INC.
SAN FRANCISCO, CA
SOFTWARE QA ENGINEER TO PROVIDE SUPPORT TO UNDERSTAND
USAGE MODELS AND DEVELOP TEST PLANS ...

SR. SOFTWARE ENGINEER
WAYNE ENTERPRISES
PALO ALTO, CA
2+ YEARS OF EXPERIENCE IN SOA, DATA AND APPLICATION
INTEGRATION, WEB SERVICES, ESB ...

SOFTWARE ENGINEER
METROPOLIS CORP.
SAN MATEO, CA
THIS POSITION IS IDEAL FOR C/C++/ANDROID EXPERIENCE. WE ARE
LOOKING FOR A HANDS-ON SELF-STARTER ...

SEE MORE ▽

Figure 5:
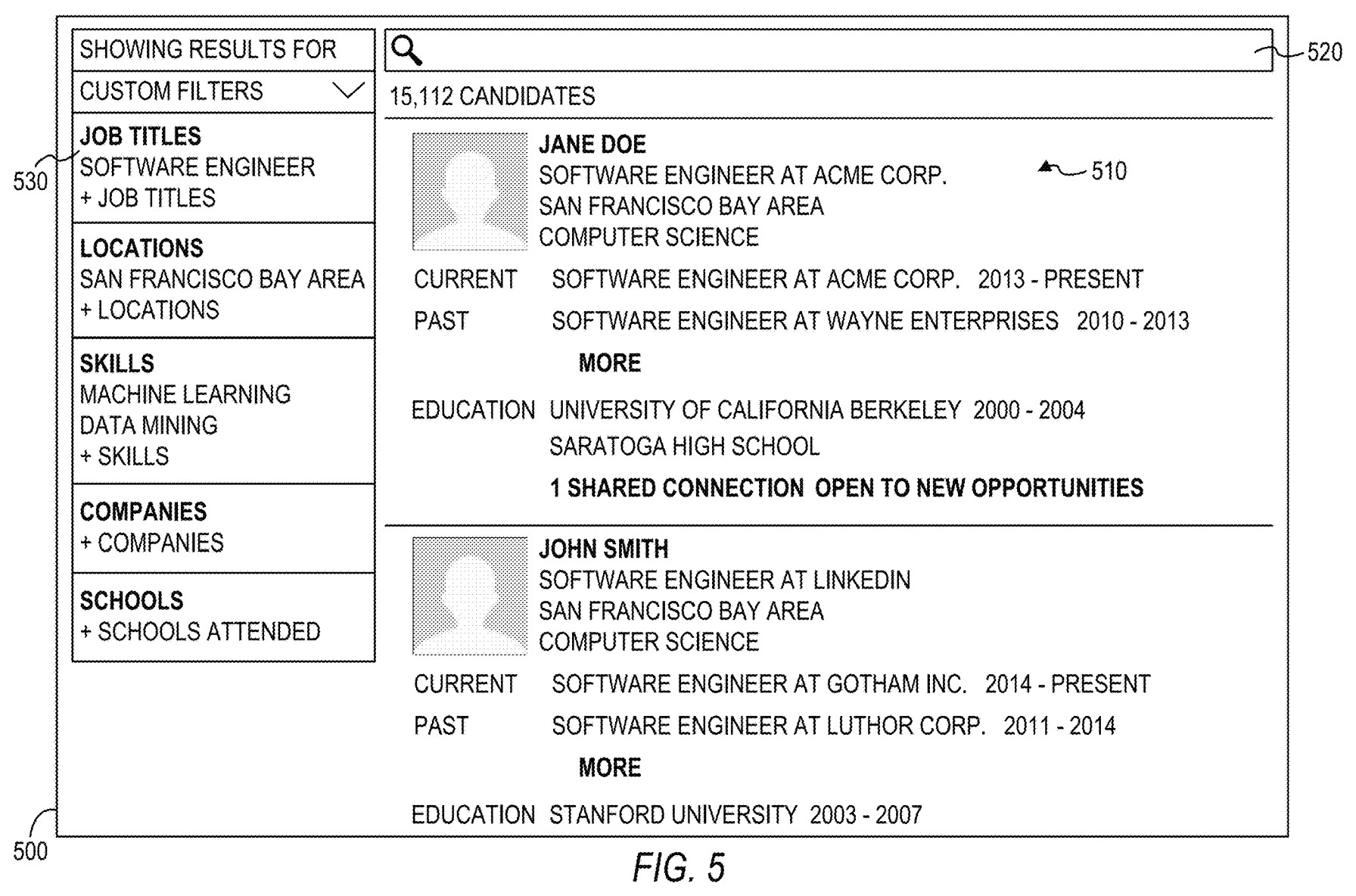

SHOWING RESULTS FOR ∨

CUSTOM FILTERS

JOB TITLES
SOFTWARE ENGINEER
+ JOB TITLES

LOCATIONS
SAN FRANCISCO BAY AREA
+ LOCATIONS

SKILLS
MACHINE LEARNING
DATA MINING
+ SKILLS

COMPANIES
+ COMPANIES

SCHOOLS
+ SCHOOLS ATTENDED

530

🔍

15,112 CANDIDATES

JANE DOE
SOFTWARE ENGINEER AT ACME CORP.
SAN FRANCISCO BAY AREA
COMPUTER SCIENCE

510

CURRENT　SOFTWARE ENGINEER AT ACME CORP.　2013 - PRESENT

PAST　　　SOFTWARE ENGINEER AT WAYNE ENTERPRISES　2010 - 2013

MORE

EDUCATION　UNIVERSITY OF CALIFORNIA BERKELEY　2000 - 2004
SARATOGA HIGH SCHOOL

1 SHARED CONNECTION OPEN TO NEW OPPORTUNITIES

JOHN SMITH
SOFTWARE ENGINEER AT LINKEDIN
SAN FRANCISCO BAY AREA
COMPUTER SCIENCE

CURRENT　SOFTWARE ENGINEER AT GOTHAM INC.　2014 - PRESENT

PAST　　　SOFTWARE ENGINEER AT LUTHOR CORP.　2011 - 2014

MORE

EDUCATION　STANFORD UNIVERSITY 2003 - 2007

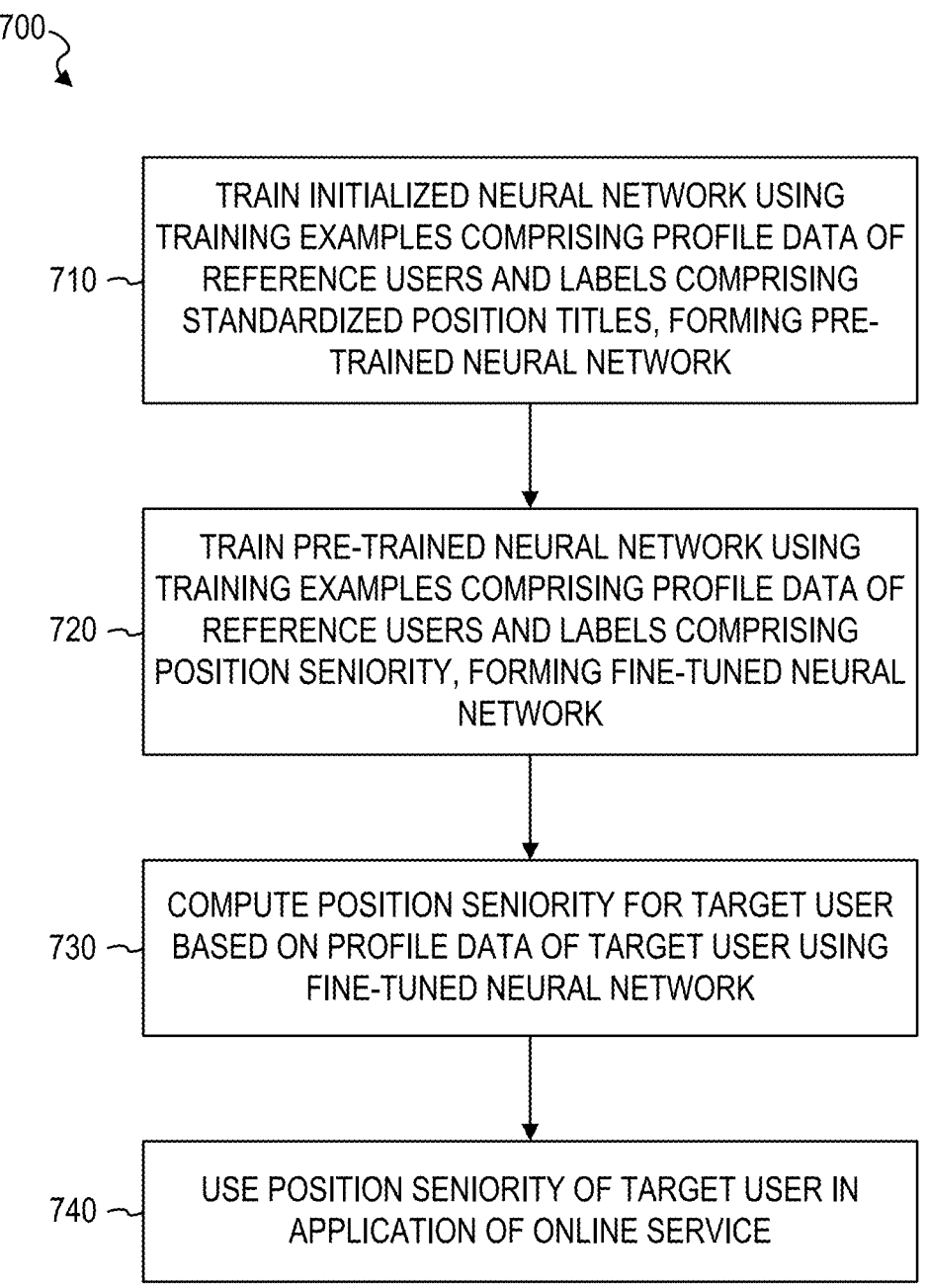

710 — TRAIN INITIALIZED NEURAL NETWORK USING TRAINING EXAMPLES COMPRISING PROFILE DATA OF REFERENCE USERS AND LABELS COMPRISING STANDARDIZED POSITION TITLES, FORMING PRE-TRAINED NEURAL NETWORK

720 — TRAIN PRE-TRAINED NEURAL NETWORK USING TRAINING EXAMPLES COMPRISING PROFILE DATA OF REFERENCE USERS AND LABELS COMPRISING POSITION SENIORITY, FORMING FINE-TUNED NEURAL NETWORK

730 — COMPUTE POSITION SENIORITY FOR TARGET USER BASED ON PROFILE DATA OF TARGET USER USING FINE-TUNED NEURAL NETWORK

740 — USE POSITION SENIORITY OF TARGET USER IN APPLICATION OF ONLINE SERVICE

*FIG. 7*

TRANSFER LEARNING FOR SENIORITY MODELING LABEL SHORTAGE

TECHNICAL FIELD

The present application relates generally to using transfer learning to address label data shortage in training a neural network to compute a seniority position for a user of an online service.

BACKGROUND

Online service providers, such as social networking services, e-commerce and marketplace services, photo sharing services, job hosting services, educational and learning services, and many others, typically require that each end-user register with the individual service to establish a user account. In most instances, a user account will include or be associated with a user profile—a digital representation of a person's identity. As such, a user profile may include a wide variety of information about the user, which may vary significantly depending upon the particular type and nature of the online service. By way of example, in the context of a social networking service, a user's profile may include information such as: first and last name, e-mail address, age, location of residence, a summary of the user's educational background, job history, and/or experiences, as well as individual skills possessed by the user. A user profile may include a combination of structured and unstructured data. For example, whereas a user's age may be stored in a specific data field as structured data, other profile information may be inferred from a free form text field such as a summary of a user's experiences. Furthermore, while some portions of a user profile, such as an e-mail address, may be mandatory—that is, the online service may require the user to provide such information in order to register and establish an account—other portions of a user profile may be optional.

In many instances, the quality of the experience a user has with a particular online service may vary significantly based on the ability of the online service to determine information from his or her user profile. In the context of an online service, a variety of content-related and recommendation services utilize various aspects of a user's profile information for targeting users to receive various content and for generating recommendations. For example, a content selection and ranking algorithm associated with a news feed, which may be referred to as a content feed, or simply a feed, may select and/or rank content items for presentation in the user's personalized content feed based on the extent to which the subject matter of a content item matches the perceived interests of the user. Here, the user's perceived interests may be based at least in part on a position seniority of the current job, or other current position, that he or she has listed in his or her profile. The position seniority of the user's current position is the rank, or other level, of the user's current position in their organization. Similarly, a job-related search engine and/or recommendation service may select and/or rank job postings for presentation to a user based in part on the position seniority of the current position in a profile of the user. Finally, a recommendation service for online courses may generate course recommendations for a user based at least in part on the position seniority of the current position that the user lists in his or her profile. Accordingly, the value of these services to the user can be significantly greater when the position seniority of the current position of the user is accurately determined, since the user is more likely to receive relevant information that is of interest to the user.

Current solutions for determining the position seniority of a user's current position involve leveraging a position title taxonomy in which standardized position title identifications have corresponding position seniority levels attached to them, such that once a raw position title that is entered by a user is standardized to the standardized position title identification, a corresponding position seniority level may be determined according to the taxonomy. However, this approach is vulnerable to inaccuracy and errors, since raw position titles that are entered by users sometimes do not accurately represent or indicate the actual position seniority of the users. For example, it is common for highly skilled and long-tenured professionals to adopt modest position titles, while exaggerated position titles are often used for relatively junior working professionals (e.g., the relatively senior position title of "Vice President" being commonly assigned to a junior employee in the banking industry). This lack of accuracy in the determination of a user's position seniority can negatively affect the functioning of the online service, such as by causing the online service to provide inaccurate and irrelevant recommendations the user.

In order to address the task of determining the position seniority of a user's current position, the inventors of the present disclosure have invented a technique of training a neural network. However, there is a lack of sufficient training data to train a neural network for this task. As a result, the training of the neural network is hindered by this lack of a critical component of the machine learning process. Additionally, other technical problems may arise as well, as will be discussed in further detail below.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 3 illustrates a graphical user interface (GUI) in which a profile of a user is displayed, in accordance with an example embodiment.

FIG. 4 illustrates a GUI of a job search application, in accordance with an example embodiment.

FIG. 5 illustrates a GUI in which user interface elements that identify profiles of users are displayed, in accordance with an example embodiment.

FIG. 7 is a flowchart illustrating a method of using transfer learning to train a neural network to compute a position seniority for a target user of an online service, in accordance with an example embodiment.

DETAILED DESCRIPTION

I. Overview

Figure 1:
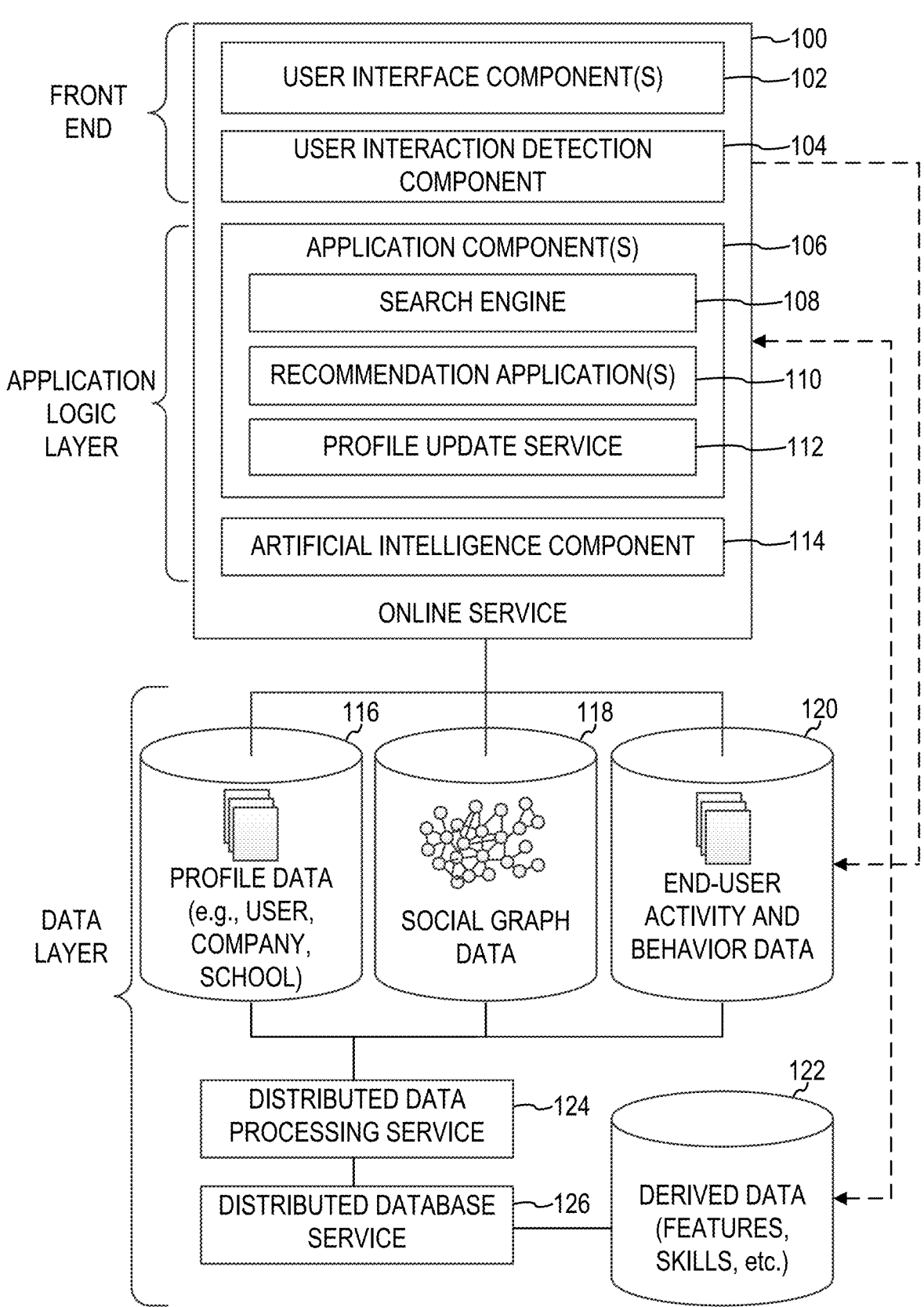
FIG. 1 is a block diagram illustrating functional components of an online service, in accordance with an example embodiment.

In the following description, for purposes of explanation, numerous specific details are set forth in order to provide a thorough understanding of example embodiments. It will be evident, however, to one skilled in the art that the present embodiments may be practiced without these specific details.

In order to make the determination of position seniority more accurate, the present disclosure provides a system and method for training a neural network to determine position seniority using features beyond raw titles entered by users to break the highly restrictive coupling between position title standardization and position seniority inference. The neural network may be trained using labelled training data that includes profile data of users as input and a corresponding position seniority for the profile data of each user as a label. However, there is a lack of such training data that includes position seniority as labels for profile data of users. In order to address this lack of training data, transfer learning is used to pre-train the neural network using title standardization as a pre-training task, since there is an abundance of standardized position titles available for use in labelled training data, and fine-tune the neural network with labelled position seniority data. Although the amount of labelled position seniority data is low, this approach leverages the knowledge learned by the neural network in the pre-training task, as the position title standardization is related to position seniority inference and can effectively and efficiency be used as the pre-training task to ensure that the neural network arrives at a state that is an effective starting point for fine-tuning using the small amount of labelled position seniority data. Furthermore, this approach uniquely uses transfer learning to train a neural network to compute a position seniority for a user even though the user has already provided a position seniority in their position title, thereby configuring the neural network to verify the accuracy of the position seniority provided by the user. The neural network is trained for the unique combination of tasks of title standardization and computation of position seniority.

The above-discussed technical problems of accuracy, relevance, and a lack of label data for training a neural network are addressed by one or more example embodiments disclosed herein, in which a specially-configured computer system is configured to use transfer learning to address label data shortage in seniority modelling. In some example embodiments, the computer system trains an initialized neural network using a first plurality of training examples. The first plurality of training examples comprises a first profile data of a first plurality of reference users of an online service and a label for the first profile data of each reference user in the first plurality of reference users. The label for the first profile data of each reference user in the first plurality of reference users comprises a standardized position title, and the training of the initialized neural network forms a pre-trained neural network. Next, the computer system may train the pre-trained neural network using a second plurality of training examples, where the second plurality of training examples comprises a second profile data of a second plurality of reference users of the online service and a label for the second profile data of each reference user in the second plurality of reference users. The label for the second profile data of each reference user in the second plurality of reference users comprises a position seniority, and the training of the pre-trained neural network forms a fine-tuned neural network. The computer system may then compute the position seniority for a first target user of the online service based on third profile data of the first target user using the fine-tuned neural network, and use the position seniority of the first target user in an application of the online service.

The term "reference" is used herein to indicate data and entities being used or involved in the training of neural networks. The term "target" is used herein to indicate data and entities being used or involved in the use of the trained neural networks.

II. Detailed Example Embodiments

The methods or embodiments disclosed herein may be implemented as a computer system having one or more components implemented in hardware or software. For example, the methods or embodiments disclosed herein may be embodied as instructions stored on a machine-readable medium that, when executed by one or more hardware processors, cause the one or more hardware processors to perform the instructions.

FIG. 1 is a block diagram illustrating functional components of an online service 100, in accordance with an example embodiment. As shown in FIG. 1, a front end may comprise one or more user interface components (e.g., a web server) 102, which receives requests from various client computing devices and communicates appropriate responses to the requesting client devices. For example, the user interface component(s) 102 may receive requests in the form of Hypertext Transfer Protocol (HTTP) requests or other web-based API requests. In addition, a user interaction detection component 104, sometimes referred to as a click tracking service, may be provided to detect various interactions that end-users have with different applications and services, such as those included in the application logic layer of the online service 100. As shown in FIG. 1, upon detecting a particular interaction, the user interaction detection component 104 logs the interaction, including the type of interaction and any metadata relating to the interaction, in an end-user activity and behavior database 120. Accordingly, data from this database 120 can be further processed to generate data appropriate for training one or more machine-learned models, and in particular, for training models to rank a set of skills for an end-user.

An application logic layer may include one or more application server components 106, which, in conjunction with the user interface component(s) 102, generate various user interfaces (e.g., web pages) with data retrieved from various data sources in a data layer. Consistent with some embodiments, individual application server components 106 implement the functionality associated with various applications and/or services provided by the online service 100. For instance, as illustrated in FIG. 1, the application logic layer includes a variety of applications and services to include a search engine 108, one or more recommendation applications 110 (e.g., a job recommendation application, an online course recommendation application), and a profile update service 112. The various applications and services illustrated as part of the application logic layer are provided as examples and are not meant to be an exhaustive listing of all applications and services that may be integrated with and provided as part of the online service 100. For example, although not shown in FIG. 1, the online service 100 may also include a job hosting service via which end-users submit job postings that can be searched by end-users, and/or recommended to other end-users by the recommendation application(s) 110. As end-user's interact with the various user interfaces and content items presented by these applications and services, the user interaction detection component 104 detects and tracks the end-user interactions, logging relevant information for subsequent use.

As shown in FIG. 1, the data layer may include several databases, such as a profile database 116 for storing profile data, including both end-user profile data and profile data for various organizations (e.g., companies, schools, etc.). Consistent with some embodiments, when a person initially registers to become an end-user of the online service, the person will be prompted by the profile update service 112 to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 116. Similarly, when a representative of an organization initially registers the organization with the online service 100, the representative may be prompted to provide certain information about the organization. This information may be stored, for example, in the profile database 116, or another database (not shown).

Once registered, an end-user may invite other end-users, or be invited by other end-users, to connect via the online service 100. A "connection" may constitute a bilateral agreement by the end-users, such that both end-users acknowledge the establishment of the connection. Similarly, with some embodiments, an end-user may elect to "follow" another end-user. In contrast to establishing a connection, the concept of "following" another end-user typically is a unilateral operation and, at least with some embodiments, does not require acknowledgement or approval by the end-user that is being followed. When one end-user follows another, the end-user may receive status updates relating to the other end-user, or other content items published or shared by the other end-user user who is being followed. Similarly, when an end-user follows an organization, the end-user becomes eligible to receive status updates relating to the organization as well as content items published by, or on behalf of, the organization. For instance, content items published on behalf of an organization that an end-user is following will appear in the end-user's personalized feed, sometimes referred to as a content feed or news feed. In any case, the various associations and relationships that the end-users establish with other end-users, or with other entities (e.g., companies, schools, organization) and objects (e.g., metadata hashtags ("#topic") used to tag content items), are stored and maintained within a social graph in a social graph database 118.

As end-users interact with the various content items that are presented via the applications and services of the online service 100, the end-users' interactions and behaviors (e.g., content viewed, links or buttons selected, messages responded to, job postings viewed, etc.) are tracked by the user interaction detection component 104, and information concerning the end-users' activities and behaviors may be logged or stored, for example, as indicated in FIG. 1 by the end-user activity and behavior database 120.

Consistent with some embodiments, data stored in the various databases of the data layer may be accessed by one or more software agents or applications executing as part of a distributed data processing service 124, which may process the data to generate derived data. The distributed data processing service 124 may be implemented using Apache Hadoop® or some other software framework for the processing of extremely large data sets. Accordingly, an end-user's profile data and any other data from the data layer may be processed (e.g., in the background or offline) by the distributed data processing service 124 to generate various derived profile data. As an example, if an end-user has provided information about various job titles that the end-user has held with the same organization or different organizations, and for how long, this profile information can be used to infer or derive an end-user profile attribute indicating the end-user's overall seniority level or seniority level within a particular organization. This derived data may be stored as part of the end-user's profile or may be written to another database.

In addition to generating derived attributes for end-users' profiles, one or more software agents or applications executing as part of the distributed data processing service 124 may ingest and process data from the data layer for the purpose of generating training data for use in training various machine-learned models, and for use in generating features for use as input to the trained models. For instance, profile data, social graph data, and end-user activity and behavior data, as stored in the databases of the data layer, may be ingested by the distributed data processing service 124 and processed to generate data properly formatted for use as training data for training one of the aforementioned machine-learned models for computing position seniority. Similarly, the data may be processed for the purpose of generating features for use as input to the machine-learned models when computing position seniority for a particular end-user. Once the derived data and features are generated, they are stored in a database 122, where such data can easily be accessed via calls to a distributed database service 124.

In some example embodiments, the application logic layer of the online service 100 also comprises an artificial intelligence component 114 that is configured to train a neural network to compute a seniority position for a user of an online service. The artificial intelligence component 114 trains the neural network using transfer learning. Transfer learning is a machine learning technique where a model trained on one task is re-purposed on a second related task. The artificial intelligence component 114 may use a transfer learning process that involves pre-training and fine-tuning a neural network, as will be discussed in further detail below.

Figure 2:
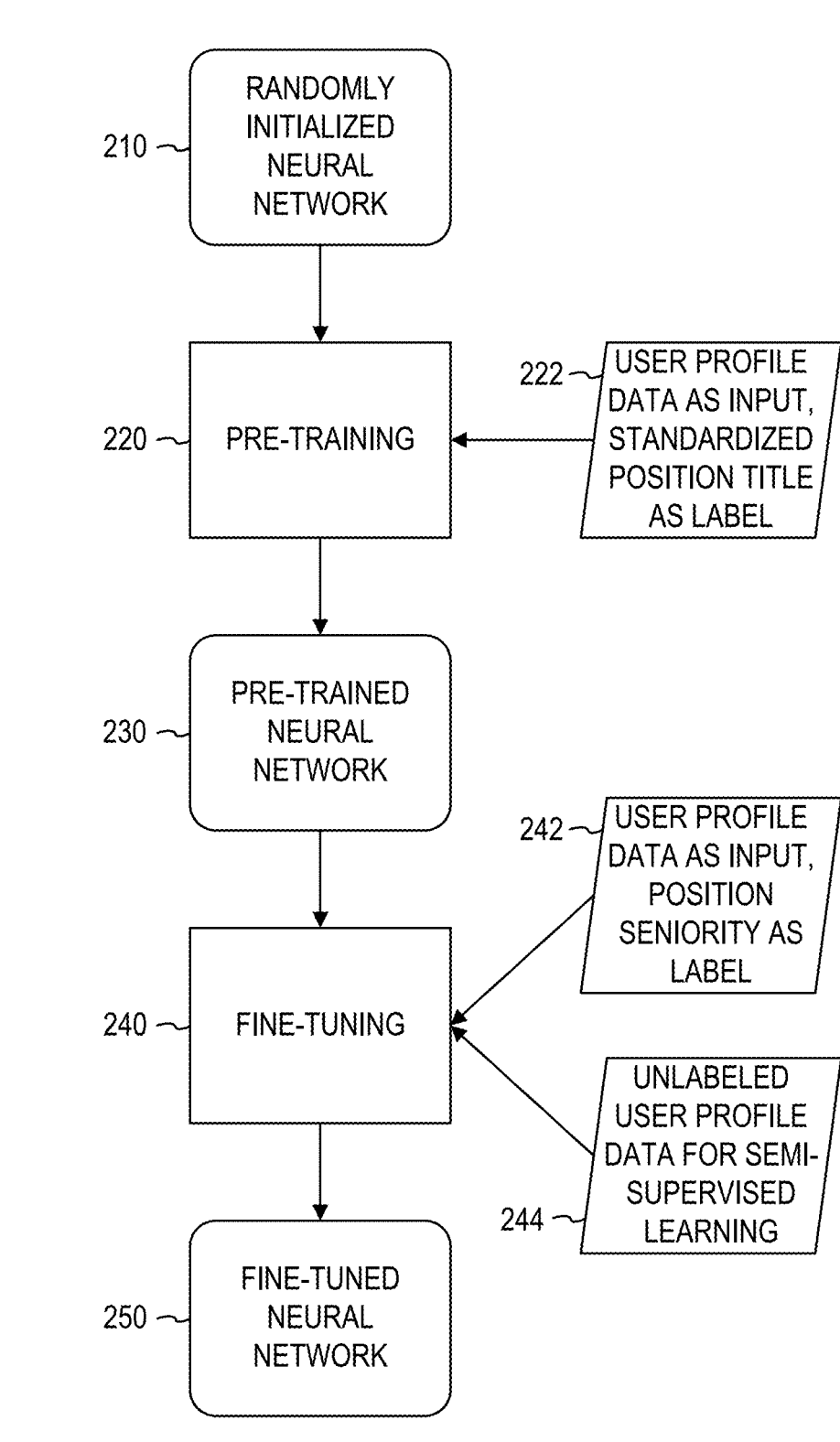
FIG. 2 is an input-output flow diagram illustrating a method of using transfer learning to train a neural network to compute a position seniority for a target user of an online service, in accordance with an example embodiment.

FIG. 2 is an input-output flow diagram illustrating a method 200 of using transfer learning to train a neural network to compute a position seniority for a target user of an online service, in accordance with an example embodiment. The method 200 can be performed by processing logic that can comprise hardware (e.g., circuitry, dedicated logic, programmable logic, microcode, etc.), software (e.g., instructions run on a processing device), or a combination thereof. In one implementation, the method 200 is performed by the online service 100 of FIG. 1, or any combination of one or more of its components (e.g., the artificial intelligence component 114).

In the method 200, a randomly initialized neural network 210 is trained by the artificial intelligence component 114 via a pre-training process 220 using a first plurality of training examples 222 as training data in the pre-training process 220. The randomly initialized neural network may comprises a deep learning model. A deep learning model is a machine learning model that uses multiple layers to progressively extract higher-level features from raw input.

In some example embodiments, the deep learning model comprises a transformer. A transformer is a deep learning model that adopts the mechanism of self-attention, differentially weighting the significance of each part of the input data. Transformers use an attention mechanism without a recurrent neural network, processing all tokens at the same time and calculating attention weights between them in successive layers. Since the attention mechanism only uses information about other tokens from lower layers, it can be computed for all tokens in parallel, which leads to improved training speed. It is contemplated that other types of neural networks are also within the scope of the present disclosure.

In some example embodiment, the first plurality of training examples 222 comprises a first profile data of a first plurality of reference users of the online service 100 and a label for the first profile data of each reference user in the first plurality of reference users. The first profile data of each reference user in the first plurality of reference users may be retrieved by the artificial intelligence component 114 from the database 116. FIG. 3 illustrates a GUI 300 in which a profile of a user is displayed, in accordance with an example embodiment. The user profile displayed in the GUI 300 comprises profile data 310 of the user. In the example shown in FIG. 3, the profile data 310 includes experience data, such as a position title 310-1, a company identification 310-2, a position description 310-3, and a position duration 310-4. Other types and combinations of profile data 310 are also within the scope of the present disclosure. In some example embodiments, the profile may comprise sequential profile data, including a sequence of different positions that the user has had. The online service 100 may extract the profile data 310 from the user profile shown in FIG. 3 for use as the training examples 222 in the pre-training process 220.

In some example embodiments, the label for the first profile data of each reference user in the first plurality of reference users in the first plurality of training examples 222 comprises a standardized position title. Data standardization is a data processing workflow that converts the structure of different datasets into one common format of data. The standardized position title, therefore, may comprise a common format of a position title that corresponds to different raw position titles that represent the same position, such as a standardizes position title to represent "Senior Manager" and "Sr. Manager." The standardized position titles for the first plurality of reference users in the first plurality of training examples 222 may be derived from the profile data of the first plurality of reference users, such as by feeding the position titles from the profile data into a software program that computes the standardized position titles. The standardized position titles may be stored in the database 122 in association with the corresponding profiles from which they were derived. The standardized position titles may be retrieved from the database 122 for use as labels for the first profile data of each reference user in the first plurality of reference users in the first plurality of training examples 222.

As a result of the training of the initialized neural network 210 by the pre-training process 220, a pre-trained neural network 230 is formed and output. The pre-trained neural network 230 is then fed into a fine-tuning process 240, where the pre-trained neural network 230 is trained using a second plurality of training examples 242. In some example embodiments, the second plurality of training examples 242 comprises a second profile data of a second plurality of reference users of the online service 100 and a label for the second profile data of each reference user in the second plurality of reference users. The second profile data in the second plurality of training examples 242 may comprise the same type of profile data as in the first plurality of training examples 222, while the label for the second profile data of each reference user in the second plurality of reference users comprises a corresponding position seniority for the profile data of each reference user in the second plurality of reference users. The position seniority comprises the rank, or other level, of the user's position in their organization. These position seniority labels are human-annotated labels that are provided by human users.

Examples of position seniorities include, but are not limited to, in-training (individual requires extensive training and guidance to complete tasks), entry-level (individual requires basic amount of training and guidance to be capable of independently completing tasks), experienced (individual has a level of experience that allows them to complete tasks independently and is capable of mentoring entry-level employees), distinguished (individual does not have direct reports, but has leadership responsibilities and advanced expertise in his/her domain), entry-level manager (individual is a first time manager with direct reports and leadership responsibilities for a single group of individuals), experienced manager (individual is an experienced manager with direct reports and leadership responsibilities for a single group of individuals), director-level (individual is an experienced manager with direct reports and leadership responsibilities for multiple groups of individuals), vice president-level (individual has direct reports and leadership responsibilities for one business function or unit), CXO-level (individual has direct reports and leadership responsibilities for the entire business function), and organizational governance (individual oversees executive management but is not responsible for the day-to-day operations of the company). Other types of position seniorities are also within the scope of the present disclosure.

In some example embodiments, the first plurality of reference users and the second plurality of reference users comprise a completely different set of reference users from one another, such that there is no overlap between the first plurality of reference users and the second plurality of reference users. The artificial intelligence component 114 may randomly select the first plurality of reference users and the second plurality of reference users, such as by randomly selecting user profiles from the profile database 116. The artificial intelligence component 114 may apply one or more filters when selecting the first plurality of reference users and the second plurality of reference users. For example, the artificial intelligence component 114 may filter out inactive users, such as by determining the last time the users interacted with the online service 100 based on interaction data stored in the end-user activity and behavior database 120 and filtering out any users who have not interacted with the online service 100 within a threshold amount of time (e.g., within the last 6 months).

In some example embodiments, the training of the pre-trained neural network 230 by the fine-tuning process 240 comprises using a semi-supervised learning process to train the pre-trained neural network 230 using the second plurality of training examples 242 as labeled training data and a third plurality of training examples 244 as unlabeled training data. The semi-supervised learning process comprises a virtual adversarial training process. Virtual adversarial training is an effective technique for local distribution smoothness. Pairs of data points are taken which are very close in the input space, but that are very far in the model output space. The model is then trained to make their outputs close to each other. In order to do that, a given input is taken and a perturbation is found for which the model produces a very different output. Then, the model is penalized for sensitivity with the perturbation. In some example embodiments, the third plurality of training examples 244 comprises perturbations of the profile data of each reference user in the second plurality of reference users. These perturbations may be created for the position titles and company identifications in the profile data of one or more of the reference users in the second plurality of reference users.

One type of perturbation that may be included in the third plurality of training examples 244 is an abbreviation. For example, if the profile data of a reference user in the second plurality of reference users includes a position title of "Senior Software Engineer," then the third plurality of training examples 244 may comprise a position title of "Sr. Software Engineer." Another type of perturbation that may be included in the third plurality of training examples 244 is a typographical error. For example, if the profile data of a reference user in the second plurality of reference users includes a position title of "Senior Software Engineer," then the third plurality of training examples 244 may comprise a position title of "Senior Software Engineer." Yet another type of perturbation that may be included in the third plurality of training examples 244 is the substitution of a word with a related word. For example, if the profile data of a reference user in the second plurality of reference users includes a position title of "Senior Software Engineer," then the third plurality of training examples 244 may comprise a position title of "Senior Software Developer." Other types of perturbations are also within the scope of the present disclosure.

As a result of the training of the pre-trained neural network 230 by the fine-tuning process 240, a fine-tuned neural network 250 is formed and output. The fine-tuned neural network 250 may then be used by the online service 100, such as by one or more of the application components 106, as will be discussed in further detail below. Profile data of a target user may be input into the fine-tuned neural network 250, which computes and outputs a position seniority of the target user based on the inputted profile data. The position seniority that is computed and output by the fine-tuned neural network 250 may comprise the actual position seniority itself (e.g., "entry-level manager") or a number, code, or some other identifier that is configured to identify the actual position seniority. The computed position seniority may be stored in the database 122 in association with the corresponding profile for use by one or more downstream applications. It is contemplated that any of the other features described within the present disclosure can be incorporated into the method 200.

FIG. 4 illustrates a GUI 400 of a job search application, in accordance with an example embodiment. In some example embodiments, the recommendation application 110 displays a corresponding selectable user interface element 420 in association with an indication 410 of the online job postings on a computing device of a target user. The recommendation application 110 may determine which online job postings to recommend to the target user based on a relevance scoring algorithm that calculates a relevance score for each online job posting indicating a level of relevance of the online job posting to the target user. The relevance scoring algorithm may incorporate the use of a position seniority computed for the first user using the fine-tuned neural network 250, increasing the likelihood that an online job posting will be selected for recommendation to the first user if the online job posting is determined by the recommendation application 110 to be related to the position seniority of the first user. The corresponding selectable user interface element 420 may be configured to, in response to its selection, trigger a display of the online job posting on the computing device of the target user or initiate an online application process for the online job posting on the computing device of the target user. The GUI 400 may also include a search field 420 configured to receive a search query from the user. In response to the search query, the search engine 108 may generate search results for the search query, such as by using the relevance scoring algorithm discussed above.

FIG. 5 illustrates a GUI 500 in which user interface elements that identify profiles of users are displayed, in accordance with an example embodiment. In some example embodiments, the search engine 108 is configured to select profiles of users that are potential job candidates based at least in part on a search query submitted by a user who is searching (referred to as a "searching user") for potential job candidates, and to cause the selected profiles of the users to be displayed on a search results page of the GUI 500 to the searching user. In the GUI 500, the searching user (e.g., a recruiter) may submit one or more terms of a search query using one or more user interface elements. For example, the searching user may submit the term(s) by either entering text into a search field 520 or by using a custom search filters panel 530 via which the searching user may select and enter the terms based on the corresponding category of the terms (e.g., job titles, locations, skills, companies, schools). In response to the search query submitted by the searching user, the search engine 108 may cause user interface elements 510 that identify the selected profiles to be displayed on the search results page. The search engine 108 may use computed position seniorities of potential job candidates in selecting which user profiles to present as search results. For example, if the searching user includes the position seniority "senior" in a search query, the search engine 108 may weight the user profiles based at least in part on whether, for each user profile, the position seniority has been computed as being "senior."

Figure 6:
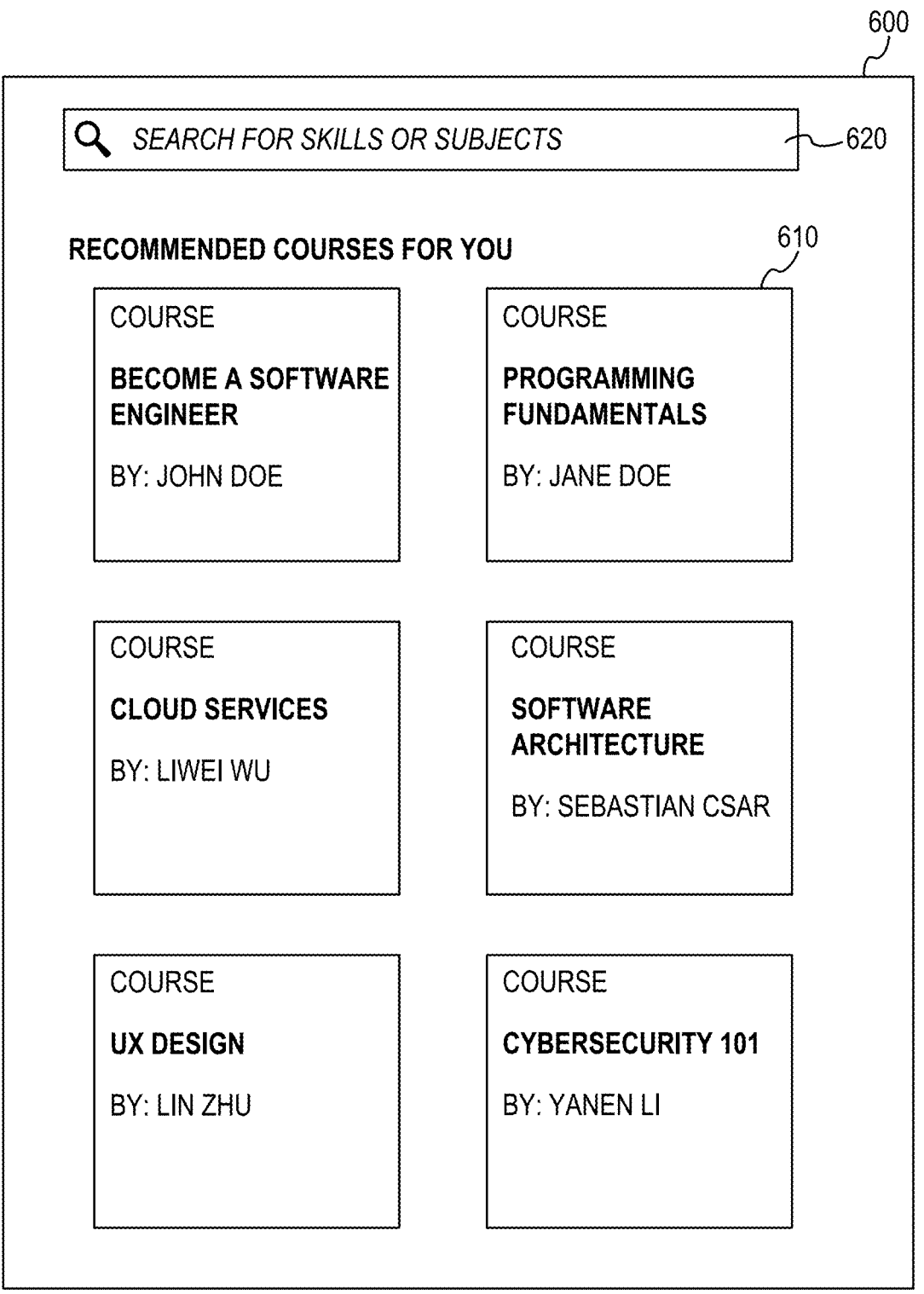
FIG. 6 illustrates a GUI of an online course application, in accordance with an example embodiment.

FIG. 6 illustrates a GUI 600 of an online course application, in accordance with an example embodiment. The recommendation application 110 may display a corresponding selectable user interface element 610 in association with an indication of an online course on a computing device of a target user. The recommendation application 110 may determine which online courses to recommend to the target user based on a relevance scoring algorithm that calculates a relevance score for each online course indicating a level of relevance of the online course to the target user. The relevance scoring algorithm may incorporate the use of the computed position seniority of the first user, increasing the likelihood that an online course will be selected for recommendation to the first user if the online course is determined by the recommendation application 110 to be related to the position seniority of the first user. The corresponding selectable user interface element 610 may be configured to, in response to its selection, trigger an online process for playing the online course on the computing device of the target user. The GUI 600 may also include a search field 620 configured to receive a search query from the target user. In response to the search query, the search engine 108 may generate search results for the search query, such as by using the relevance scoring algorithm discussed above.

FIG. 7 is a flowchart illustrating a method 700 of using transfer learning to train a neural network to compute a position seniority for a target user of an online service, in accordance with an example embodiment. The method 700 can be performed by processing logic that can comprise hardware (e.g., circuitry, dedicated logic, programmable logic, microcode, etc.), software (e.g., instructions run on a processing device), or a combination thereof. In one implementation, the method 700 is performed by the online service 100 of FIG. 1, or any combination of one or more of its components (e.g., the artificial intelligence component 114, the application component 106), as described above.

At operation 710, the online service 100 trains an initialized neural network using a first plurality of training examples. The first plurality of training examples comprises a first profile data of a first plurality of reference users of the online service 100 and a label for the first profile data of each reference user in the first plurality of reference users. The label for the first profile data of each reference user in the first plurality of reference users comprises a standardized position title. The training of the initialized neural network forms a pre-trained neural network. In some example embodiments, the initialized neural network comprises a deep learning model. The deep learning model may comprise a transformer. Other types of neural networks are also within the scope of the present disclosure. In some example embodiments, the first profile data of each reference user in the first plurality of reference users comprise a position title, a company identification, a position description, and a position duration. The first profile data may comprise other configurations and types of profile data.

At operation 720, the online service 100 trains the pre-trained neural network using a second plurality of training examples. The second plurality of training examples comprises a second profile data of a second plurality of reference users of the online service 100 and a label for the second profile data of each reference user in the second plurality of reference users. The label for the second profile data of each reference user in the second plurality of reference users comprises a position seniority. The training of the pre-trained neural network forms a fine-tuned neural network. In some example embodiments, the second profile data of each reference user in the second plurality of reference users comprise a position title, a company identification, a position description, and a position duration. The second profile data may comprise other configurations and types of profile data.

In some example embodiments, the training of the pre-trained neural network, at operation 720, comprises using a semi-supervised learning process to train the pre-trained neural network using the second plurality of training examples as labeled training data and a third plurality of training examples as unlabeled training data. The semi-supervised learning process may comprise a virtual adversarial training process, and the third plurality of training examples may comprise perturbations of the profile data of each reference user in the second plurality of reference users.

At operation 730, the online service 100 computes the position seniority for a first target user of the online service 100 based on third profile data of the first target user using the fine-tuned neural network. In some example embodiments, the third profile data of the first target user comprise a position title, a company identification, a position description, and a position duration. The third profile data may comprise other configurations and types of profile data.

At operation 740, the online service 100 uses the position seniority of the first target user in an application of the online service 100. In some example embodiments, the using of the position seniority of the first target user in the application of the online service 100 comprises selecting a job posting from a plurality of job postings based on a determination that the position seniority of the first target user is stored in a database in association with the job posting, and then displaying, on a computing device of the first target user, the selected job posting as a search result for a search query submitted by the first target user via the computing device or as a recommendation. In some example embodiments, the using of the position seniority of the first target user in the application of the online service 100 comprises determining that a search query submitted by a second target user includes the position seniority of the first target user, selecting a profile of the first target user based on the determining that the determining that the search query includes the position seniority of the first target user, and then displaying, on a computing device of the second target user, a user interface element that identifies the profile of the first target user based on the selecting the profile of the first target user. In some example embodiments, the using of the position seniority of the first target user in the application of the online service 100 comprises selecting an online course from a plurality of online courses based on a determination that the position seniority of the first target user is stored in a database in association with the online course, and then displaying, on a computing device of the first target user, the selected online course as a search result for a search query submitted by the first target user via the computing device or as a recommendation. The online service 100 may use the computed position seniority in other ways as well.

It is contemplated that any of the other features described within the present disclosure can be incorporated into the method 700.

Certain embodiments are described herein as including logic or a number of components or mechanisms. Components may constitute either software components (e.g., code embodied (1) on a non-transitory machine-readable medium or (2) in a transmission signal) or hardware-implemented components. A hardware-implemented component is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented component that operates to perform certain operations as described herein.

In various embodiments, a hardware-implemented component may be implemented mechanically or electronically. For example, a hardware-implemented component may comprise dedicated circuitry or logic that is permanently configured (e.g., as a special-purpose processor, such as a field programmable gate array (FPGA) or an application-specific integrated circuit (ASIC)) to perform certain operations. A hardware-implemented component may also comprise programmable logic or circuitry (e.g., as encompassed within a programmable processor) that is temporarily configured by software to perform certain operations. It will be appreciated that the decision to implement a hardware-implemented component mechanically, in dedicated and permanently configured circuitry, or in temporarily configured circuitry (e.g., configured by software) may be driven by cost and time considerations.

Accordingly, the term "hardware-implemented component" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented components are temporarily configured (e.g., programmed), each of the hardware-implemented components need not be configured or instantiated at any one instance in time. For example, where the hardware-implemented components comprise a processor configured using software, the processor may be configured as respective different hardware-implemented components at different times. Software may accordingly configure a processor, for example, to constitute a particular hardware-implemented component at one instance of time and to constitute a different hardware-implemented component at a different instance of time.

Hardware-implemented components can provide information to, and receive information from, other hardware-implemented components. Accordingly, the described hardware-implemented components may be regarded as being communicatively coupled. Where multiple of such hardware-implemented components exist contemporaneously, communications may be achieved through signal transmission (e.g., over appropriate circuits and buses) that connect the hardware-implemented components. In embodiments in which multiple hardware-implemented components are configured or instantiated at different times, communications between such hardware-implemented components may be achieved, for example, through the storage and retrieval of information in memory structures to which the multiple hardware-implemented components have access. For example, one hardware-implemented component may perform an operation, and store the output of that operation in a memory device to which it is communicatively coupled. A further hardware-implemented component may then, at a later time, access the memory device to retrieve and process the stored output. Hardware-implemented components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions. The components referred to herein may, in some example embodiments, comprise processor-implemented components.

Similarly, the methods described herein may be at least partially processor-implemented. For example, at least some of the operations of a method may be performed by one or more processors or processor-implemented components. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a component, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 8:
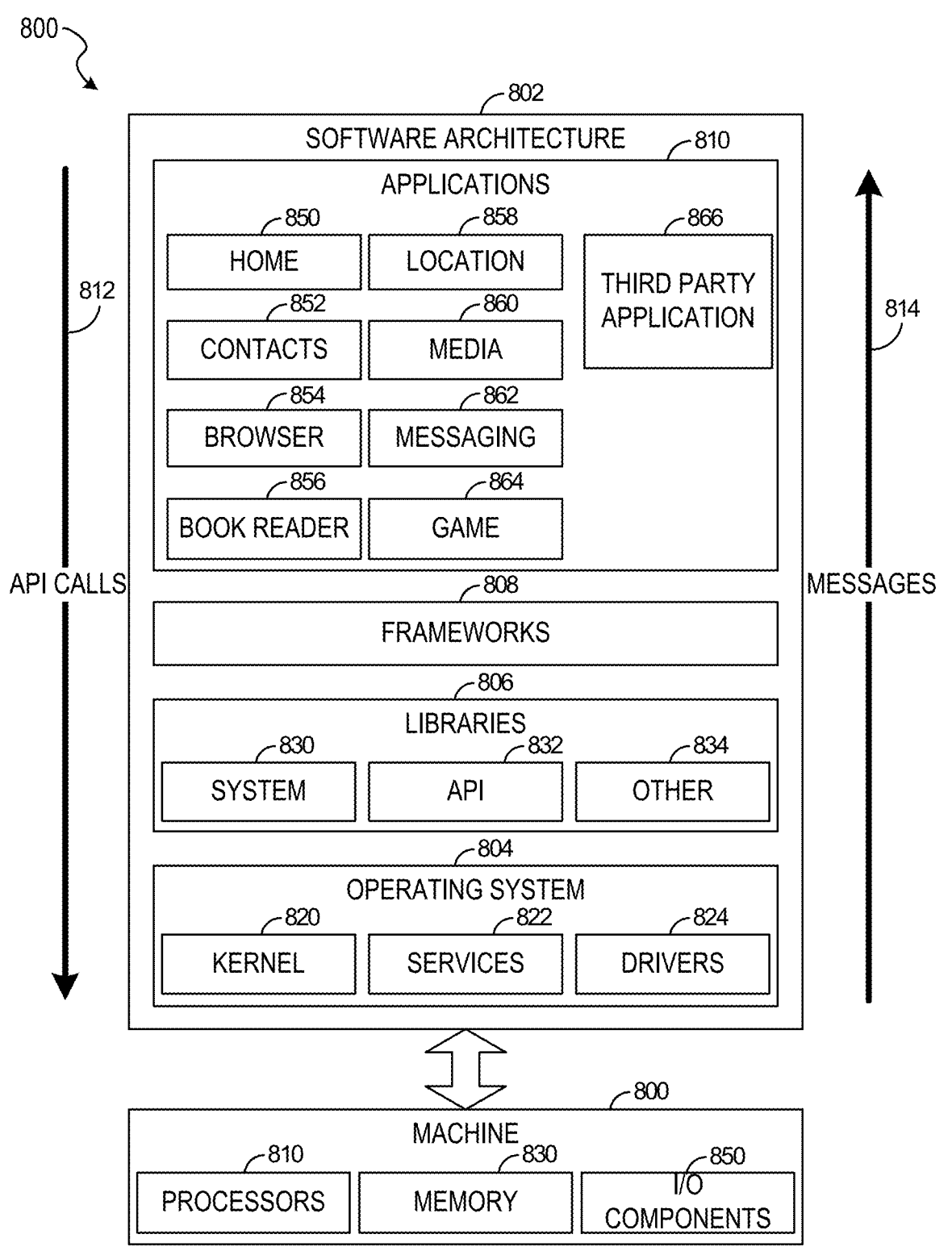
FIG. 8 is a block diagram illustrating a software architecture, in accordance with an example embodiment.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 810, memory 830, and input/output (I/O) components 850. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
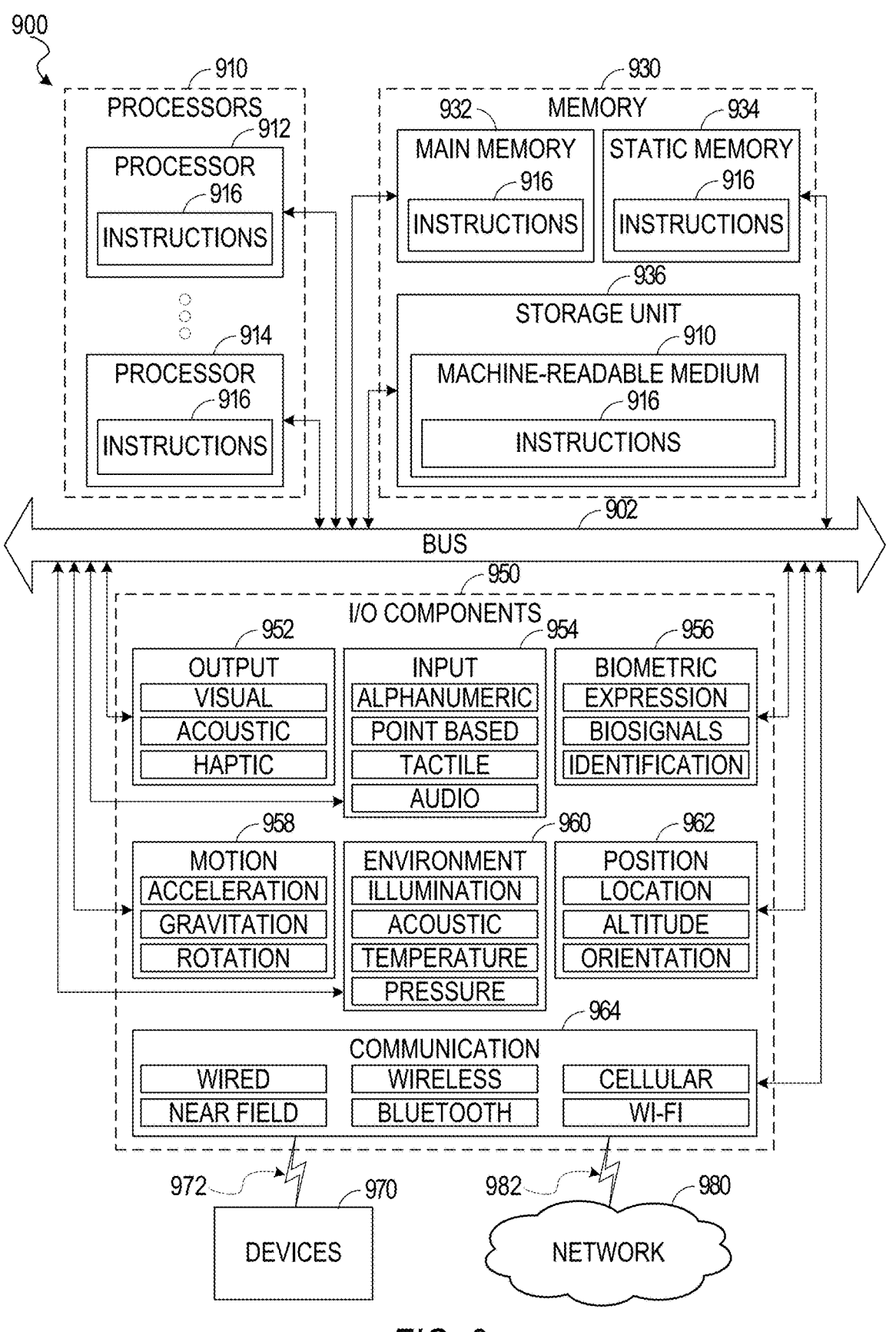
FIG. 9 illustrates a diagrammatic representation of a machine in the form of a computer system within which a set of instructions may be executed for causing the machine to perform any one or more of the methodologies discussed herein, in accordance with an example embodiment.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application 910, an applet, an app, or other executable code) for causing the machine 900 to perform any one or more of the methodologies discussed herein may be executed. For example, the instructions 916 may cause the machine 900 to execute the method 600 of FIG. 6. Additionally, or alternatively, the instructions 916 may implement FIGS. 1-6, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors 912 (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor), multiple processors 910 with a single core, multiple processors 910 with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine 900 will depend on the type of machine 900. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 916 and/or data. The terms shall accordingly be taken to include, but not be limited to, solid-state memories, and optical and magnetic media, including memory internal or external to the processors 910. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method performed by a computer system having a memory and at least one hardware processor, the computer-implemented method comprising:

selecting a first plurality of reference users and a second plurality of reference users;

filtering out inactive users from the first plurality of reference users or the second plurality of reference users based on interaction data stored in a database;

training an initialized neural network using a first plurality of training examples, the first plurality of training examples comprising profile data of the first plurality of reference users of an online service and a first label for the profile data of each reference user in the first plurality of reference users, the first label comprising a standardized position title, the training of the initialized neural network forming a pre-trained neural network;

training the pre-trained neural network using a second plurality of training examples, the second plurality of training examples comprising profile data of the second plurality of reference users of the online service and a second label for the profile data of each reference user in the second plurality of reference users, the second label comprising a position seniority, the training of the pre-trained neural network forming a fine-tuned neural network;

computing the position seniority for a first target user of the online service based on profile data of the first target user using the fine-tuned neural network;

using the position seniority of the first target user in an application of the online service to select a content item; and displaying, on a user interface of a computing device, the content item.

2. The computer-implemented method of claim 1, wherein the initialized neural network comprises a deep learning model.

3. The computer-implemented method of claim 2, wherein the deep learning model comprises a transformer.

4. The computer-implemented method of claim 1, wherein the profile data of each reference user in the first plurality of reference users, the profile data of each reference user in the second plurality of reference users, and the profile data of the first target user each comprise a position title, a company identification, a position description, and a position duration.

5. The computer-implemented method of claim 1, wherein the training the pre-trained neural network comprises using a semi-supervised learning process to train the pre-trained neural network using the second plurality of training examples as labeled training data and a third plurality of training examples as unlabeled training data.

6. The computer-implemented method of claim 5, wherein the semi-supervised learning process comprises a virtual adversarial training process, and the third plurality of training examples comprises perturbations of the profile data of each reference user in the second plurality of reference users.

7. The computer-implemented method of claim 1, wherein the using the position seniority of the first target user in the application of the online service comprises:

selecting a job posting from a plurality of job postings based on a determination that the position seniority of the first target user is stored in a database in association with the job posting; and displaying, on a computing device of the first target user, the selected job posting.

8. The computer-implemented method of claim 1, wherein the using the position seniority of the first target user in the application of the online service comprises:

determining that a search query submitted by a second target user includes the position seniority of the first target user;

selecting a profile of the first target user based on the determining that the search query includes the position seniority of the first target user; and displaying, on a computing device of the second target user, a user interface element that identifies the profile of the first target user based on the selecting the profile of the first target user.

9. The computer-implemented method of claim 1, wherein the using the position seniority of the first target user in the application of the online service comprises:

selecting an online course from a plurality of online courses based on a determination that the position seniority of the first target user is stored in a database in association with the online course; and displaying, on a computing device of the first target user, the selected online course.

10. A system comprising:

at least one hardware processor; and a non-transitory machine-readable medium embodying a set of instructions that, when executed by the at least one hardware processor, cause the at least one hardware processor to perform operations, the operations comprising:

select a first plurality of reference users and a second plurality of reference users;

filter out inactive users from the first plurality of reference users or the second plurality of reference users based on interaction data stored in a database;

train an initialized neural network using a first plurality of training examples, the first plurality of training examples comprising profile data of the first plurality of reference users of an online service and a label for the profile data of each reference user in the first plurality of reference users, the label for the first profile data comprising a standardized position title, the training of the initialized neural network forming a pre-trained neural network;

train the pre-trained neural network using a second plurality of training examples, the second plurality of training examples comprising profile data of the second plurality of reference users of the online service and a label for the second profile data of each reference user in the second plurality of reference users, the label for the second profile data comprising a position seniority, the training of the pre-trained neural network forming a fine-tuned neural network;

compute the position seniority for a first target user of the online service based on profile data of the first target user using the fine-tuned neural network;

use the position seniority of the first target user in an application of the online service to select a content item; and display, on a user interface of a computing device, the content item.

11. The system of claim 10, wherein the initialized neural network comprises a deep learning model.

12. The system of claim 11, wherein the deep learning model comprises a transformer.

13. The system of claim 10, wherein the profile data of each reference user in the first plurality of reference users, the profile data of each reference user in the second plurality of reference users, and the profile data of the first target user each comprise a position title, a company identification, a position description, and a position duration.

14. The system of claim 10, wherein the training the pre-trained neural network comprises using a semi-supervised learning process to train the pre-trained neural network using the second plurality of training examples as labeled training data and a third plurality of training examples as unlabeled training data.

15. The system of claim 14, wherein the semi-supervised learning process comprises a virtual adversarial training process, and the third plurality of training examples comprises perturbations of the profile data of each reference user in the second plurality of reference users.

16. The system of claim 10, wherein the using the position seniority of the first target user in the application of the online service comprises:

select a job posting from a plurality of job postings based on a determination that the position seniority of the first target user is stored in a database in association with the job posting; and display, on a computing device of the first target user, the selected job posting.

17. The system of claim 10, wherein the using the position seniority of the first target user in the application of the online service comprises:

determine that a search query submitted by a second target user includes the position seniority of the first target user;

select a profile of the first target user based on the determining that the search query includes the position seniority of the first target user; and display, on a computing device of the second target user, a user interface element that identifies the profile of the first target user based on the selecting the profile of the first target user.

18. The system of claim 10, wherein the using the position seniority of the first target user in the application of the online service comprises:

select an online course from a plurality of online courses based on a determination that the position seniority of the first target user is stored in a database in association with the online course; and display, on a computing device of the first target user, the selected online course.

19. A non-transitory machine-readable medium embodying a set of instructions that, when executed by at least one hardware processor, cause the at least one hardware processor to perform operations, the operations comprising:

select a first plurality of reference users and a second plurality of reference users;

filter out inactive users from the first plurality of reference users or the second plurality of reference users based on interaction data stored in a database;

train an initialized neural network using a first plurality of training examples, the first plurality of training examples comprising profile data of the first plurality of reference users of an online service and a label for the first profile data of each reference user in the first plurality of reference users, the label for the first profile data comprising a standardized position title, the training of the initialized neural network forming a pre-trained neural network;

train the pre-trained neural network using a second plurality of training examples, the second plurality of training examples comprising profile data of the second plurality of reference users of the online service and a label for the second profile data of each reference user in the second plurality of reference users, the label for the second profile data of each reference user comprising a position seniority, the training of the pre-trained neural network forming a fine-tuned neural network;

compute the position seniority for a first target user of the online service based on profile data of the first target user using the fine-tuned neural network;

use the position seniority of the first target user in an application of the online service to select a content item; and display, on a user interface of a computing device, the content item.

20. The non-transitory machine-readable medium of claim 19, wherein the initialized neural network comprises a deep learning model.

*  *  *  *  *